United States Patent [19]

Douglas et al.

[11] Patent Number: 4,599,101
[45] Date of Patent: Jul. 8, 1986

[54] UNIVERSAL SERVO-DRIVEN GOB DISTRIBUTOR

[75] Inventors: Robert J. Douglas, North Granby; Robert L. Doughty, West Hartford; John P. Mungovan, Simsbury; Robert P. Andersen, Monroe; Vaughan Abbott, North Granby, all of Conn.

[73] Assignee: Emhart Industries, Inc., Farmington, Conn.

[21] Appl. No.: 734,096

[22] Filed: May 15, 1985

[51] Int. Cl.[4] .................................. C03B 7/08
[52] U.S. Cl. ......................... 65/164; 65/163; 65/207; 65/225
[58] Field of Search ................. 65/163, 164, 207, 225

[56] References Cited

U.S. PATENT DOCUMENTS

| | | | |
|---|---|---|---|
| Re. 28,759 | 4/1976 | Bystrianyk et al. | 65/207 |
| 2,955,383 | 10/1960 | Lauck | 65/225 |
| 3,775,083 | 11/1973 | Nebelung et al. | 65/207 X |
| 4,266,961 | 5/1981 | Wood | 65/164 X |
| 4,357,158 | 11/1982 | Garza | 65/225 |
| 4,400,192 | 8/1983 | Farkas | 65/163 X |
| 4,453,963 | 6/1984 | Larson et al. | 65/164 X |
| 4,529,431 | 7/1985 | Mumford | 65/225 |

FOREIGN PATENT DOCUMENTS 56-129734  8/1981  Japan .

Primary Examiner—Arthur Kellogg
Attorney, Agent, or Firm—A. W. Breiner

[57] ABSTRACT

A gob distributor for directing glass gobs to glassware-forming sections. Most particularly, this relates to the automatic positioning of scoops receiving the glass gobs from the glassmaking apparatus and directing them into troughs of glassware-forming sections which are arranged in a bank. The gob distributor features an arrangement wherein the distributor may be converted to vary the number of scoops in a scoop group from one to three or more. A principal feature of the gob distributor is the utilization of a servomotor which is a reversible DC motor for positioning a rack which controls the angle of the scoops.

19 Claims, 13 Drawing Figures

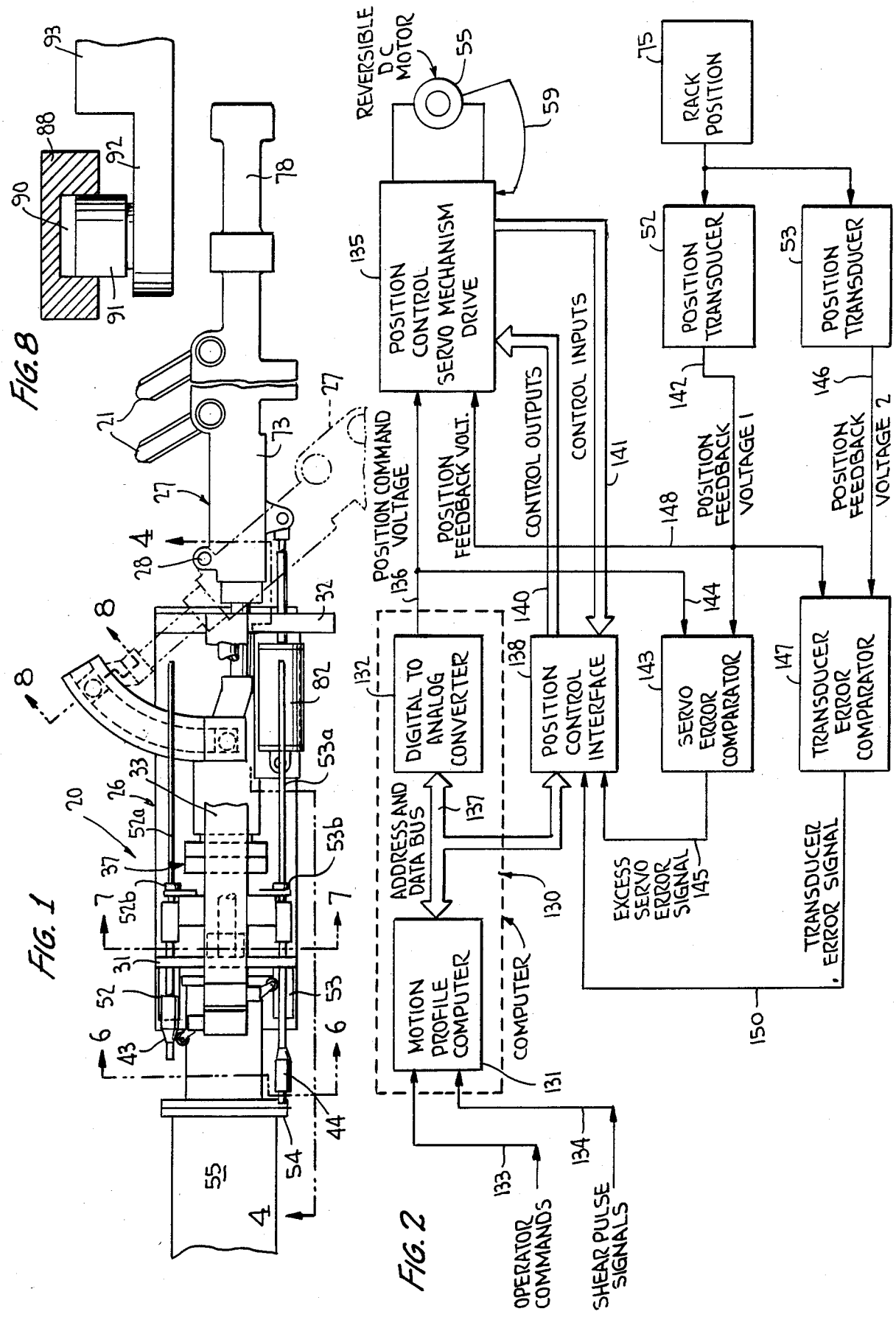

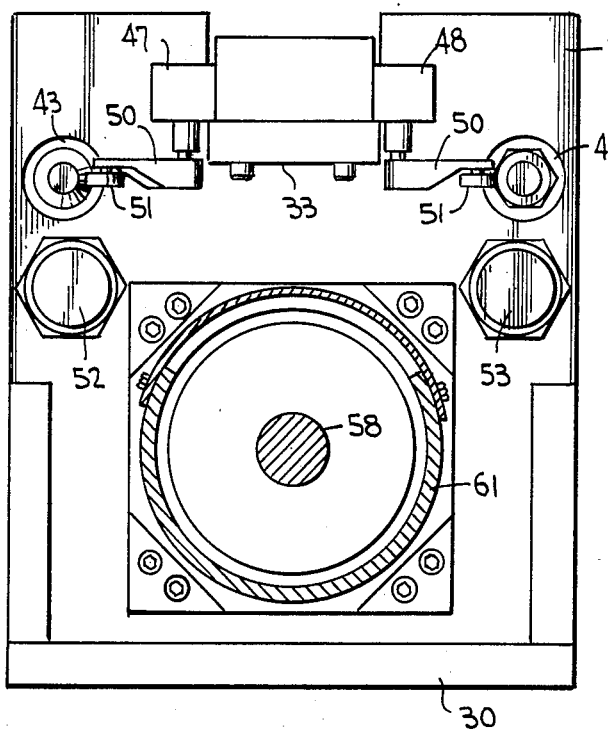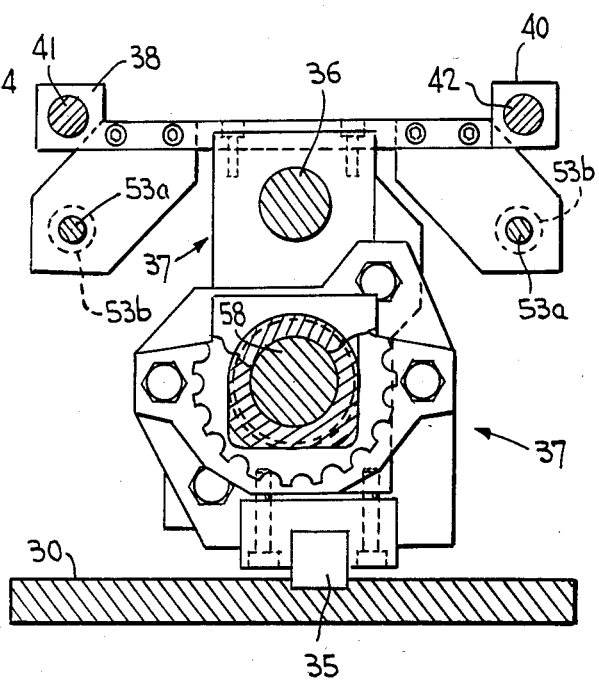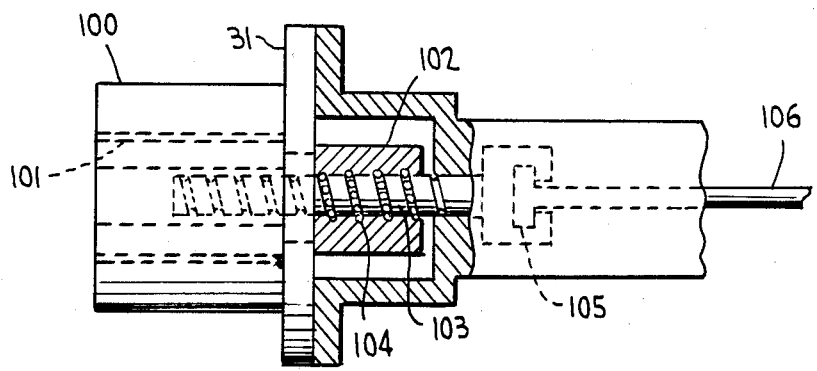

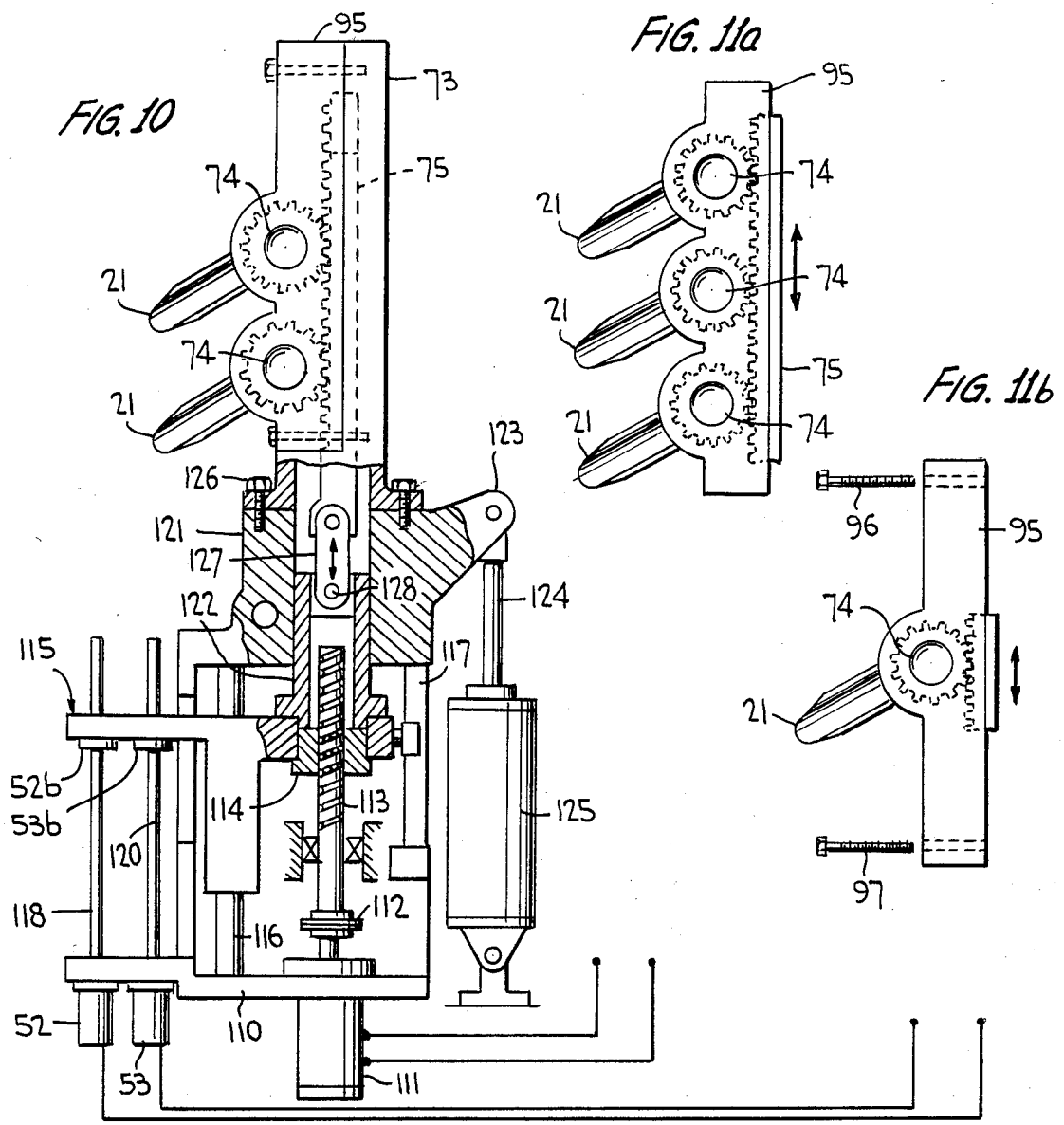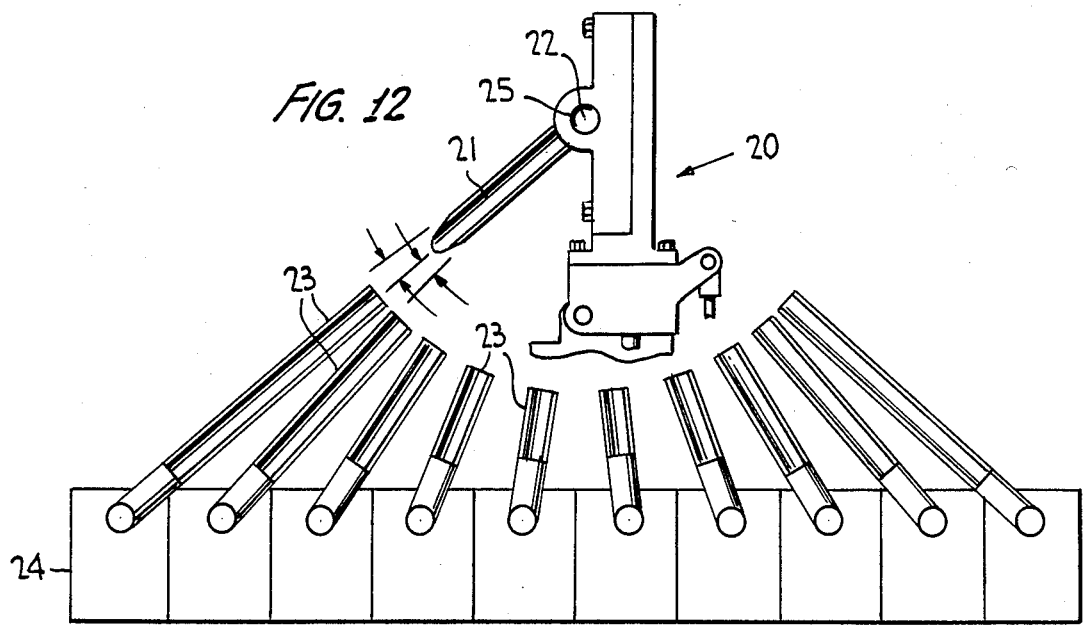

UNIVERSAL SERVO-DRIVEN GOB DISTRIBUTOR

This invention relates in general to gob distributing mechanisms for distributing glass gobs from a gob feeder to individual glassware-forming sections which are arranged in side-by-side relationship. This invention constitutes a modification on the distribution system disclosed in U.S. Pat. No. Re. 28,759, granted Apr. 6, 1976, which is assigned to the assignee of the present application.

In the past, scoops for distributing glass gobs to troughs leading to glassware-forming sections were mounted for movement into alignment with the troughs for the glasswareforming sections in sequence utilizing a rotary cam. This required that the troughs be fed from one section to the other section, in a predetermined sequence, requiring a camming system. In accordance with this invention, the rack which engages pinions carrying the scoops is positioned by means of a servomotor through a rotary-to-linear drive. The servomotor may be programmed to distribute the gobs to the troughs in any beneficial sequence. Further, if not all glassware-forming sections of a machine are to be operating, the servomotor may be programmed to deliver glass gobs to only the active sections.

In accordance with this invention, actuation of the servomotor, which is a reversible DC motor, is controlled by a position-control servo mechanism drive which, in turn, is controlled by a motion profile computer which may be manually set.

The control for the servomotor may also include position transducers actuated by the position of the rack so as to provide an error signal when compared with the command. The error signal is then directed to a position-control interface and together with a signal from the computer directs a control output to the position-control servo mechanism drive.

In accordance with this invention, the rotary-to-linear drive coupling the servomotor to the rack may be of the ball-nut type wherein a nut and an asociated shaft are provided with grooves in which the balls continuously circulate as either the shaft or the nut is rotated.

Another feature of the invention is the utilization of an air cylinder to preload the mechanism to eliminate or reduce backlash.

It is to be understood that there are different modes of the machines which will be serviced with glass gobs. Some glassware-forming sections receive but a single glass gob, while others receive two at a time and a third receives three at a time. It will be apparent that even a greater number than three can be provided. In order that the gob distributor may be universal, the rack and pinion and the scoops are carried by a removable housing. The housing will be formed separate from the support for the servomotor and the rotary-to-linear drive. The housing will either be separately mounted as hereinafter illustrated, or releasably connected to the rotary-to-linear drive, also as hereinafter illustrated. When the housing is separately mounted, it may be pivoted with respect to the support for the servomotor. The entire unit may then be replaced by another having a different number of scoops. On the other hand, the housing may be releasably fixed to the support for the servomotor and the entire assembly mounted for a pivotal movement to an out-of-the-way position. A combination of these features may also be utilized.

The drive for the rack beneficially includes a slide assembly coupled between the rotary-to-linear drive and the rack, and which slide assembly will carry actuators for the rack position transducers and for limit switches.

Other features of the invention will become apparent from the drawings and the following description.

In the drawing, wherein throughout like numerals refer to like parts,

FIG. 1 is a plan view of the gob distributor showing in phantom lines the alternate position of one embodiment of the pivotally mounted scoop section;

FIG. 2 is a schematic flow diagram showing the details of the control for the servomotor;

FIG. 6 is a large fragmentary transverse vertical sectional view taken generally along the line 6—6 of FIG. 1 and shows the cross-section of the mechanism;

FIG. 7 is an enlarged fragmentary transverse sectional view taken generally along the line 7—7 of FIG. 1 and shows further the mounting of the drive mechanism for the rack;

FIG. 8 is an enlarged fragmentary sectional view taken generally along the line 8—8 of FIG. 1 and shows the connection between a shaft for the scoop unit and an arcuate cam arm carried by a slide unit of the mechanism;

FIG. 9 is an enlarged fragmentary elevational view with parts broken-away illustrating sections showing how the servomotor may be of a hollow construction so as to have received therein the shaft of the shaft-and-nut assembly, thereby reducing the length of the unit;

FIG. 10 is a fragmentary plan view of a modified form of scoop support and drive arrangements with parts broken-away and shown in cross-section;

FIGS. 11a and 11b are schematic plan views of replaceable scoop groups; and

FIG. 12 is a schematic view showing the relation of a pivotally mounted gob scoop to troughs leading to the glassware-forming sections.

Figure 3:
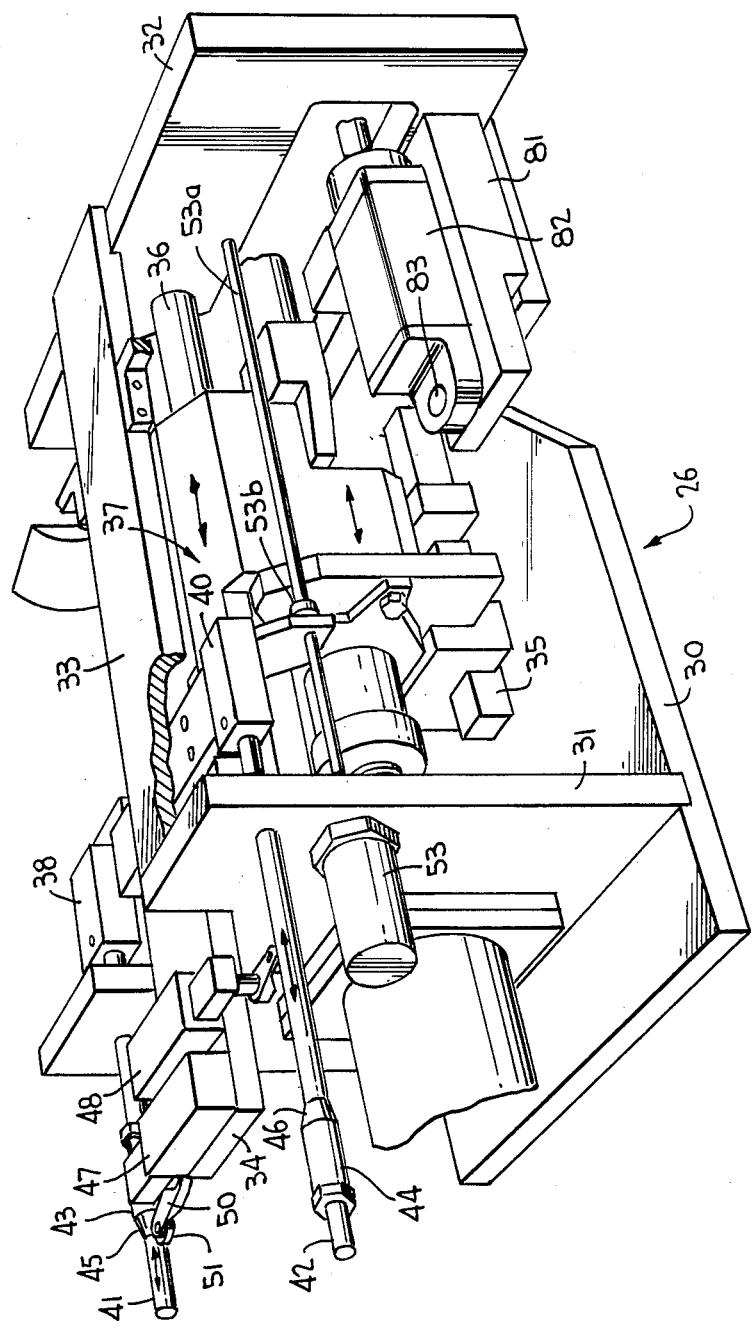
FIG. 3 is a perspective view showing the details of the mounting of a slide mechanism which is reciprocated by the servomotor and to which the rack is releasably coupled.

Reference is first made to FIG. 12 wherein it will be seen that there is schematically illustrated a gob distributor formed in accordance with this invention, the gob distributor being identified by the numeral 20. The gob distributor 20, as will be explained in more detail hereinafter, carries a scoop 21 which is pivotally mounted as at 22 for swinging back and forth along an array of troughs 23, with each trough 23 leading into a glassware-forming section 24 which in and of itself is not part of this invention. The glassware-forming sections 24 are arranged in a side-by-side relationship with the result that the troughs 23 are of different lengths. Further, it will be seen that in accordance with this invention the spacing between receiving ends of adjacent troughs 23 may be varied.

It is also pointed out here that the scoop 21 has a gob receiving end 25 which is coaxial with the pivot 22.

For descriptive purposes, it is to be understood that the glass gobs may be distributed in groups of 1, 2, 3 or more gobs. It is also to be understood that the glassware-forming sections 24 may be constructed to simultaneously receive 1, 2, 3 or more gobs and, therefore, each glassware-forming section 24 is provided with a group of troughs equal in number to the number of glass gobs in the gob group. Finally, while only one gob scoop has been illustrated in FIG. 12, it is to be understood that addditional scoops could be used, depending upon the number of glass gobs to be processed in the individual sections at one time.

Reference is made at this time to FIGS. 11a and 11b wherein it will be seen that there are illustrated replacement units for the two-scoop unit shown in FIG. 10. The replacement units as shown include one or three scoops.

Reference is now made to FIG. 1 wherein there is illustrated one preferred embodiment of the invention. In this illustration there are two gob scoops 21 in their clockwise-most position. Also in this embodiment of the invention, the gob distributor 20 includes a fixed support 26 which may be fixedly secured to the main frame of the glassware-forming sections 24 and a separate support 27 which is mounted for pivotal movement about a vertical axis 28 relative to the fixed support 26.

Figure 4:
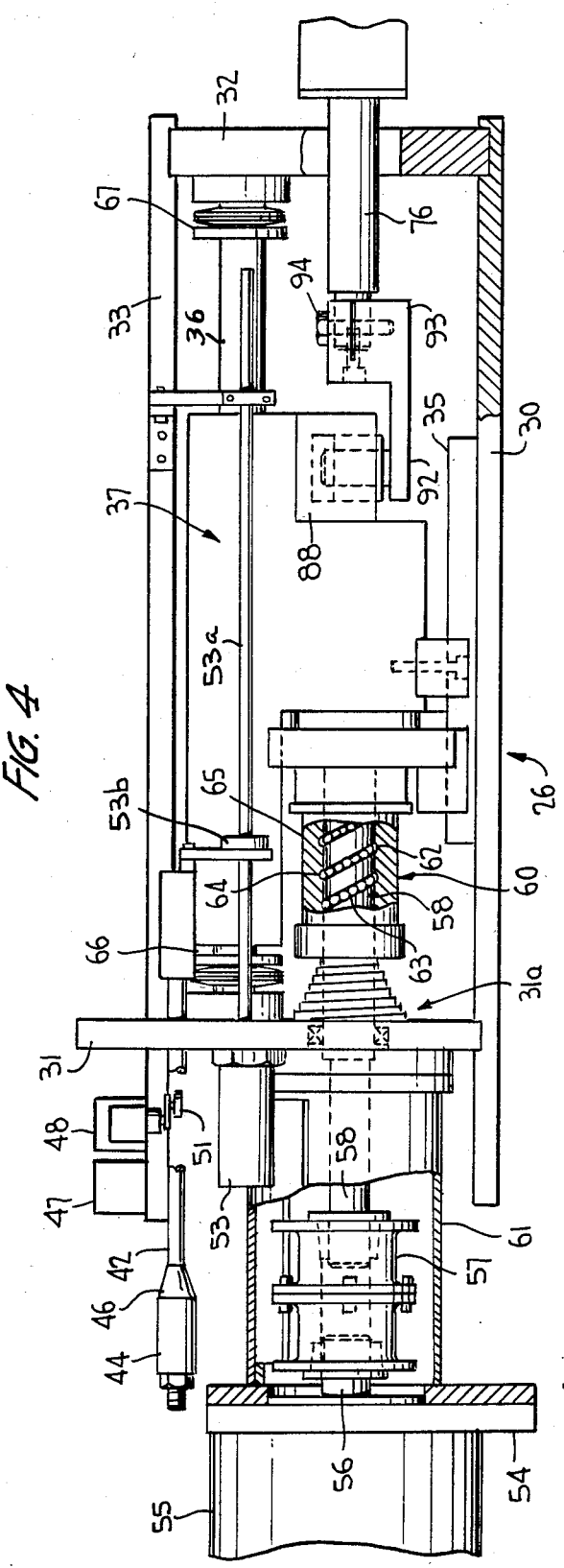
FIG. 4 is a side elevational view of a left-hand portion of the apparatus taken along the line 4—4 of FIG. 1 with parts broken-away and shown in section.
Figure 5:
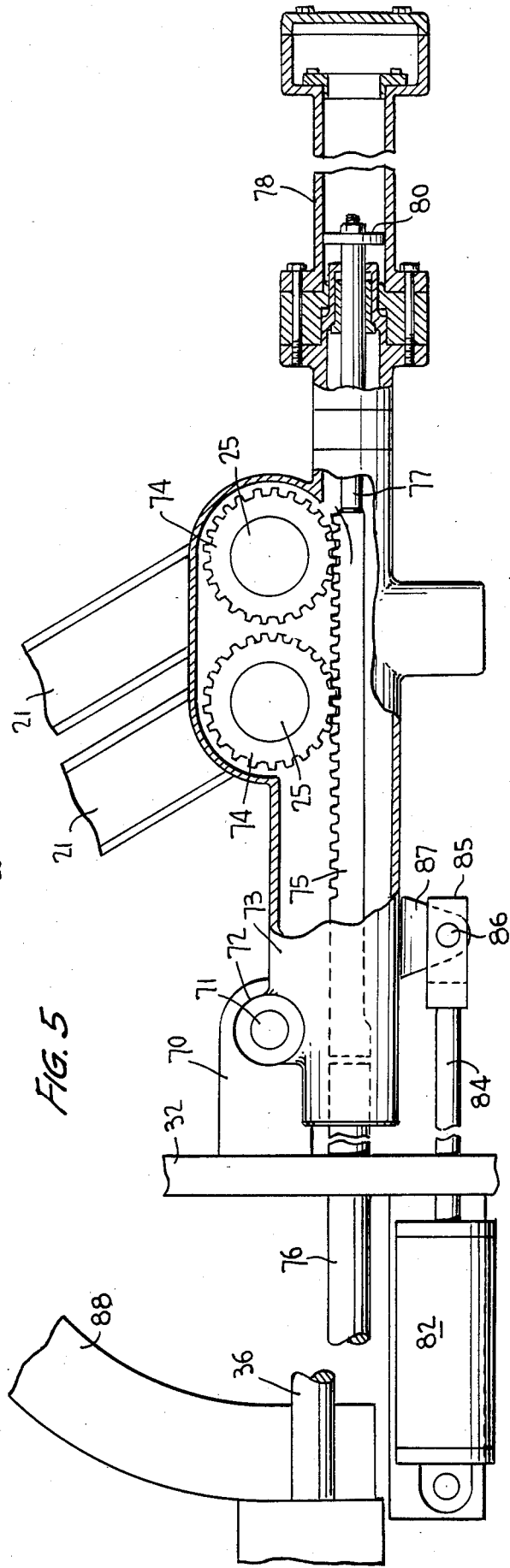
FIG. 5 is a plan view of the right-hand portion of the apparatus with parts broken-away and shown in cross-section, and clearly shows the manner in which a rack positions the scoops and the manner in which the scoop unit is mounted for pivotal movement for movement to an out-of-the-way position where at it may be serviced.

Reference is now made to FIGS. 3, 4, and 5 wherein more details of the gob distributor 20 are illustrated. First of all, the fixed support 26 includes a mounting plate 30 which may be secured to the main beam of the array of glassware-forming sections 24. The plate 30 has extending vertically therefrom a mounting plate 31 and a mounting plate 32 which are connected together at their tops by a tie-bar 33 which has a portion 34 projecting beyond the plate 31.

The mounting plate 30 has secured to the upper surface thereof a guide key 35 and a guide rod 36 which extends between upper parts of the mounting plates 31, 32 generally below the tie-bar 33. A slide mechanism, generally identified by the numeral 37, is mounted on the guide key 35 and the guide bar 36 for back-and-forth reciprocation.

The slide unit 37 carries a pair of supports 38, 40 which carry rods 41, 42 which extend through the mounting plate 31 and which carry limit switch cam actuators 43, 44, with the actuator 43 having a cam surface 45 facing to the left and the actuator 44 having a cam surface 46 facing to the right.

The bar extension 34 is provided with a pair of limit switches 47, 48. Each limit switch 47, 48 includes an actuating arm 50 carrying a cam follower 51. If the slide unit 37 moves too far to the left, the cam 45 will engage the cam follower 51 and actuate the limit switch 47. On the other hand, if the slide assembly moves too far to the right, the cam 46 will engage the cam follower of the limit switch 48 and actuate that switch.

Transducers 52, 53 include sensing tubes 52a and 53a which are stationarily mounted in the mounting plate 31 and extend therefrom. Magnetic sensing heads 52b, 53b are mounted in a bracket extending downwardly from the supports 38 and 40 and surround sensing tubes 52a and 53a. Linear displacement transducers of the type useful herein are commercially available. One such type is marketed by Temposonics Incorporated, 131 East Ames Court, Plainview, N.Y. 11803, under model number DCTM-12.

Referring now to FIG. 4, it will be seen that the fixed support 26 also includes a mounting plate 54 which carries a servomotor 55, the servomotor being a reversible DC motor. The servomotor 55 has a shaft 56 which is coupled by means of a coupling 57 to an input shaft 58 of a rotary-to-linear drive, generally identified by the numeral 60. The coupling 57 is positioned within a casing 61 which extends between the mounting plates 31 and 54.

The rotary-to-linear drive 60 is in the form of a circulating nut coupling wherein a shaft, such as the extension of the drive shaft 58, will be provided with spiral grooves 62 and in which balls 63 continuously circulate. The balls 63 are received in grooves 64 in a nut 65. The nut 65 is suitably fixedly secured to the slide unit 37. A mounting bearing 31a is mounted in support 31 which is designed to prevent linear motion of shaft 58.

Thus, as the motor 55 rotates, it will advance or retract the nut 65 which, in turn, will advance or retract the slide unit 37. With respect to the slide unit 37, it will be seen that suitable stops 66 and 67 will be adjustably carried by the mounting plates 31, 32 to limit the travel of the slide unit 37.

Referring now to FIG. 5, it will be seen that a bracket 70 extends forwardly from the mounting plate 32 and carries a vertical pivot pin 71 on which a pivot sleeve 72 is channeled for pivoting. The pivot sleeve 72 is carried by an elongated housing 73 which carries the scoops 21. The scoops 21, in turn, are supported in a manner which is not part of this invention, but do include pinions 74 through which the gob receiving openings 25 extend.

A rack 75 is positioned within the housing 73 and meshed with the pinions 74. The left part of the rack 75 is carried by a circular shaft portion 76 which is suitably journaled within the left portion of the housing 73. The right portion of rack 75 is in alignment with a smaller diameter shaft 77 which is journaled in the right end of the housing 73 and is in the form of a piston rod of an air cylinder 78 and carries a piston 80 whereby the shaft 77 is biased against the rack 75.

In order that the housing 73 and the components carried thereby may be pivoted to an out-of-the-way position, as shown in phantom lines in FIG. 1, the support plate 30 carries a mounting block 81, as is shown in FIG. 3, on which a fluid motor 82 is mounted by means of a pivot pin 83. The fluid motor 82 has a piston rod 84 which extends to the right through the mounting plate 32 and carries a fitting 85, including a pivot pin 86 which extends through a bracket 87 carried by the housing 73. When the fluid motor 82 is actuated in the position illustrated in FIG. 5, the piston rod 84 is retracted, causing the housing 73 to pivot in a clockwise direction.

As is best shown in FIGS. 4 and 5, the slide unit 37 carries an arcuate cam arm 88 which lies generally in a horizontal plane. The arcuate cam arm 88, as is clearly shown in FIG. 8, has an arcuate slot 90 formed in the underside thereof and receives a cam follower 91. The cam follower 91 is carried by an extension 92 of an adapter 93 to which the shaft 76 is releasably secured by a bolt 94.

When it is desired to repair or interchange the scoop assembly of the embodiment shown in FIGS. 1-8, including the scoops 21, the rack 75 and the pinions 74, it is necessary to remove pivot pin 71, pin 86, bolt 94, and then slide the housing forwardly out of support 32.

Reference is next made to FIG. 9 wherein there is illustrated a modified form of a servomotor generally identified by the numeral 100. The servomotor 100 has a hollow shaft 101 which is coupled to a nut 102 of a ball-nut drive unit which includes a reciprocal shaft 103 and balls 104 connecting the shaft 103 to the nut 102.

By way of a coupling 105, the reciprocal shaft 103 is connected to a shaft or rod 106 which will be connected to the equivalent of the slide unit 37.

Reference is now made to FIG. 10 wherein a modified form of the invention is illustrated. In this embodiment, there is a support structure 110 which carries a servomotor 111. The servomotor 111 is connected by way of a coupling 112 to a shaft 113 of a ball-nut assembly, including a nut 114. The nut 114 is carried by a slide unit 115 which is mounted on a guide shaft 116 and a guide key 117 carried by the support 110.

Transducers 52, 53 include sensing tubes 118, 120 which are stationarily mounted in the support structure and which extend through magnetic sensing heads 52b and 53b mounted on the slide unit 115. There will also be means for actuating limit switches (not shown), such as limit switches 47, 48 described in connection with the previous embodiment.

The support 110 remote from the servomotor 111 includes a housing portion 121 in which there is slideably mounted a tubular drive member 122 which is coupled to the slide unit 115. The housing 121 has an offset arm 123 to which is connected a piston rod 124 of a fluid motor 125 which will be suitably anchored relative to the support 110.

The housing 121 has removably bolted thereto by means of bolts 126 a housing corresponding to the housing 73. In the housing 73 there is journaled the rack 75 which engages pinions 74 carrying scoops 21.

A link 127 couples the rack 75 to the member 122 in an adjustable manner. The link 127 is connected to the rack 75 by way of a removable pin 128 which, when removed, in association with the removal of the bolts 126, permits the gob distributor unit to be removed from the remainder of the assembly for the purpose of repairs, replacements, or substitution of a different number of scoops in the scoop group.

Also in the embodiment shown in FIG. 10, when it is desired to repair or interchange the scoop assembly, it is possible to merely remove bolts 96 and 97, and remove the removable portion 95 which carries the scoops 21 as well as the rack and pinion mechanism, and repair the unit or replace the unit with a unit as shown in FIGS. 11a and 11b.

The structural details of the gob distributor having been clearly defined, reference is now made to FIG. 2 wherein the controls for the servomotor 55 are illustrated.

First, there is a computer unit, generally identified by the numeral 130. The computer unit 130 includes a motion profile computer 131 and a digital-to-analog convertor 132.

The motion profile computer 131 has coupled thereto leads 133 and 134 through which an operator command and a shear pulse signal may be directed into the computer. The operator command permits the setting of sequence of presentation of the scoops to the troughs, and permits an operator to add or remove glassware-forming sections 24 from the bank of machines.

It is to be understood that the glass from which glass gobs are formed is extruded as a solid mass and is sheared at intervals. Upon each shearing of the glass runner, a signal is directed to the computer through the lead 134.

Operation of the servomotor 55 is directly controlled by a position-control servo mechanism drive identified by the numeral 135. A tachometer on servomotor 55 is connected to the position-control servo mechanism drive through lead 59. The drive 135 is coupled to the digital-to-analog convertor by a lead 136 through which a position-command voltage is directed to the drive 135. The digital-to-analog converter 132 is coupled to the motion profile computer by an address and data bus 137, and this bus is also connected to a position-control interface 138. The position-control interface has a control output 140 which is coupled to the drive 135.

It will be seen that the position-control interface 138 also receives control inputs through a lead 141 from the drive 135.

The position transducer 52 is coupled by a lead 142 to a servo error comparator 143 which also receives a position-command voltage to a lead 144 coupled to the lead 136. The input of the servo error comparator 143 is coupled by way of a lead 145 to the position-control interface 138.

The second position transducer 53 directs a position feedback voltage through a lead 146 to a transducer error comparator 147. The comparator 147 also receives a position feedback voltage from the drive 135 through a lead 148 which is also coupled to the lead 142 for directing such a control voltage to the servo error comparator.

The comparator 147 has a lead 150 connected to the position control interface 138 for directing thereto an excess transducer error signal.

From the foregoing it will be obvious to one skilled in the electronic control art that the reversible DC motor which forms a servomotor 55 will be automatically controlled to drive the rotary to linear drive in turn to reciprocate and thus position the rack 75 whereby to periodically pivot the scoops 21 in accordance with the gob-forming operation so as to sequentially direct gobs to the various glassware-forming sections 24 in any desired sequence which will provide for the most efficient operation of the bank of glassware-forming sections 24.

Although only several embodiments of the invention have been specifically illustrated and described herein, it is to be understood that minor variations may be made in the gob distributor without departing from the spirit and scope of the invention as defined by the appended claims.

It is claimed:

1. A gob distributor for conveying in a preselected sequence successively formed groups of glass gobs to fixed troughs groups, each glass gob group including one or more glass gobs and each trough group including a number of troughs corresponding to the number of glass gobs in each glass gob group, said gob distributor comprising a group of scoops, the number of scoops in said group of scoops also corresponding to the number of glass gobs in each glass gob group, each scoop having a pivot axis, a pinion fixed to each scoop for rotation about said pivot axis, a rack engaged with each rack pinion for positioning said scoop group in a preselected sequence with said trough groups, and improved positioning means for longitudinally shifting and positioning said rack; said improved positioning means comprising a servomotor having a shaft coupled to said rack by a rotary to linear drive unit, and a position-control servo mechanism drive electrically coupled to said servomotor for controlling the rotational position of said servomotor shaft.

2. A gob distributor according to claim 1 together with a motion profile computer coupled to and controlling said position-control servo mechanism drive.

3. A gob distributor according to claim 2 together with means for determining the position of said rack, and control means influenced by the position of said rack coupled to and controlling said position-control servo mechanism drive.

4. A gob distributor according to claim 3 wherein said control means includes a position-control interface coupled between said computer and said position-control servo mechanism drive.

5. A gob distributor according to claim 3 wherein said means for determining the position of said rack includes first and second position transducers associated with said rack.

6. A gob distributor according to claim 4 wherein said means for determining the position of said rack includes first and second position transducers associated with said rack, said transducers having outputs coupled to said position-control interface.

7. A gob distributor according to claim 6 wherein a servo error comparator is coupled between said first position transducer and said position-control interface to supply an excess servo error signal to said position-control interface.

8. A gob distributor according to claim 6 wherein a transducer error comparator is coupled between said second position transducer and said position-control interface for supplying a transducer error signal to said position-control interface.

9. A gob distributor according to claim 8 wherein a servo error comparator is coupled between said first position transducer and said position-control interface to supply an excess servo error signal to said position-control interface.

10. A gob distributor according to claim 9 together with means for supplying a control input to said position-control interface from said position-control servo mechanism drive.

11. A gob distributor according to claim 1 wherein said position-control servo mechanism drive is operative to move said scoop group other than from one trough group to the next adjacent trough group.

12. A gob distributor according to claim 1 together with limit switches for deactivating said servo motion in the event of excessive movement of said rack.

13. A gob distributor according to claim 5 together wtih limit switches for deactivating said servo motion in the event of excessive movement of said rack.

14. A gob distributor according to claim 13 together with a slide assembly disposed between said rotary-to-linear drive and said rack, and there are actuator members for said transducers and said limit switches carried by said slide assembly.

15. A gob distributor according to claim 1 together with an air cylinder coupled to said rack to reduce backlash.

16. A gob distributor according to claim 1 wherein said scoop group and said rack and pinion are carried by a support separate and apart from said servomotor, said rotary-to-linear drive and said position-control servo mechanism drive, releasable means coupling said rack to said drive; and said support, said rack and pinion, and said scoop group being removable and interchangeable to vary the number of scoops in accordance with the number of glass gobs to be distributed at each setting of said scoop group.

17. A gob distributor according to claim 16 wherein there is a slide unit driven by said drive, and said rack is releasably coupled to said slide.

18. A gob distributor according to claim 16 wherein said separate support is normally releasably fixedly secured to a pivotally mounted support for said servomotor and said rotary-to-linear drive.

19. A gob distributor according to claim 16 wherein said separate support is separately mounted for pivotal movement to an out-of-the-way position for handling.

* * * * *